(12) United States Patent
Dodak et al.

(10) Patent No.: US 8,336,413 B2
(45) Date of Patent: Dec. 25, 2012

(54) RACK AND PINION STEERING APPARATUS HAVING RACK BEARING WEAR COMPENSATION WITH DAMPING

(75) Inventors: Tony M. Dodak, Frankenmuth, MI (US); Anthony J. Champagne, Saginaw, MI (US); Michael A. Eickholt, New Lothrop, MI (US); George E. Arlt, Midland, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 1290 days.

(21) Appl. No.: 12/102,212

(22) Filed: Apr. 14, 2008

(65) Prior Publication Data

US 2008/0190229 A1 Aug. 14, 2008

Related U.S. Application Data

(63) Continuation-in-part of application No. 11/409,111, filed on Apr. 21, 2006.

(60) Provisional application No. 60/695,494, filed on Jun. 30, 2005, provisional application No. 60/930,062, filed on May 14, 2007, provisional application No. 60/931,521, filed on May 24, 2007.

(51) Int. Cl.
*F16H 1/04* (2006.01)
*F16H 35/00* (2006.01)
(52) U.S. Cl. ....... 74/388 PS; 74/409; 74/422; 188/267.1
(58) Field of Classification Search ............... 74/388 PS, 74/422, 409, 411; 188/267, 267.1, 267.2; 180/402; 384/40, 255, 447; 474/135
See application file for complete search history.

(56) References Cited

U.S. PATENT DOCUMENTS

| | | | |
|---|---|---|---|
| 2,669,325 A * | 2/1954 | Raines | 188/267 |
| 4,095,482 A | 6/1978 | Kirschner | |
| 4,224,833 A | 9/1980 | Jablonsky | |
| 4,691,583 A | 9/1987 | Taig | |
| 4,815,329 A | 3/1989 | Ansgar et al. | |
| 6,119,540 A | 9/2000 | Phillips | |
| 6,247,375 B1 | 6/2001 | Gierc et al. | |
| 6,409,111 B1 | 6/2002 | Kokko | |
| 6,435,050 B1 | 8/2002 | Tanke, II et al. | |
| 6,547,043 B2 * | 4/2003 | Card | 188/267.2 |
| 6,659,218 B2 * | 12/2003 | Thomas et al. | 180/402 |
| 6,662,912 B2 * | 12/2003 | Smith et al. | 188/267.1 |
| 7,118,504 B2 * | 10/2006 | Meckstroth et al. | 474/135 |
| 7,281,444 B1 | 10/2007 | Bishop | |
| 7,980,152 B2 * | 7/2011 | Arlt | 74/422 |
| 2003/0074996 A1 | 4/2003 | Camp | |
| 2007/0000341 A1 | 1/2007 | Arlt et al. | |
| 2007/0209463 A1 | 9/2007 | Song et al. | |

* cited by examiner

FOREIGN PATENT DOCUMENTS

GB 655130 * 11/1951 ............... 74/388 PS

*Primary Examiner* — Vinh T. Luong
(74) *Attorney, Agent, or Firm* — Cantor Colburn LLP

(57) ABSTRACT

A power steering apparatus includes a housing defining a chamber. A rack is disposed within the chamber and is moveable along a longitudinal axis. A pinion extends into the chamber for meshing engagement with the rack. A bearing supports the rack relative to the housing and is moveable relative to the housing to re-position the rack relative to the pinion. An adjustment mechanism continuously biases the bearing in response to loosening of the meshing engagement to re-position the rack. A dampener resists the movement of the bearing to slow the re-positioning of the bearing. Preferably, the dampener includes a plastic fluid having a very high viscosity. The plastic fluid is disposed between adjacent moving parts to resist the relative movement between the bearing and the housing.

18 Claims, 7 Drawing Sheets

RACK AND PINION STEERING APPARATUS HAVING RACK BEARING WEAR COMPENSATION WITH DAMPING

CROSS REFERENCE TO RELATED APPLICATION

This application is a continuation-in-part of U.S. patent application Ser. No. 11/409,111 filed on Apr. 21, 2006, which claims the benefit of U.S. Provisional Patent Application Ser. No. 60/695,494 filed on Jun. 30, 2005, the disclosures of each of which are hereby incorporated by reference; and this application also claims the benefit of U.S. Provisional Patent Application Ser. No. 60/930,062 filed on May 14, 2007 and U.S. Provisional Patent Application Ser. No. 60/931,521 filed on May 24, 2007, the disclosures of each of which are hereby incorporated by reference.

BACKGROUND OF THE INVENTION

1. Field of the Invention

The subject invention generally relates to a power steering apparatus for turning steerable wheels on a vehicle.

2. Description of the Prior Art

Power steering systems having a rack and a pinion are utilized in nearly all of today's vehicles to steer at least two of the wheels of a vehicle. The steering wheel of the vehicle is typically connected to a pinion gear that is in meshing engagement with a rack. The rack and pinion is supported in a housing and the rack translates the rotational movement of the pinion and steering wheel into a linear movement. The linear movement of the rack is translated to the steerable wheels of the car typically by a tie rod connected to each of the steerable wheels. In addition, power steering systems typically include an assisting force that provides a pressure or a force in proportion to the rotation of the steering wheel for assisting the linear movement of the rack. The assisting force is an additional system that may be a hydraulic system utilizing a hydraulic piston coupled to the rack or electrical system utilizing an electric motor to supply the assisting force to the rack. In either system there is a desire to properly support and allow for adjustments to the meshing engagement between the pinion and the rack during the operational life of the power steering apparatus.

The rack can be supported in the housing by a bearing to reduce the frictional resistance on the linear movement of the rack within the housing. The bearing also supports the rack and typically is adjustable to position the rack in proper meshing engagement with the pinion. The bearing, such as that disclosed in U.S. Pat. No. 6,247,375, utilizes a yoke with a bearing surface that is eccentric to the housing to support and adjust the rack into proper meshing engagement with the pinion. The yoke is installed into a housing of the power steering assembly. Once installed, the yoke is rotated thereby adjusting the support and positioning the rack in proper meshing engagement with the pinion. The yoke is then permanently staked or locked into position with a tool to deform the housing to support and secure the yoke in the rotated position. Since the yoke is staked into position the yoke and bearing support is not adjustable after the complete installation of the yoke into the assembly. Therefore the yoke does not allow for adjustment of the rack after the completed assembly of a vehicle, and further provides no adjustment during the operation of the power steering assembly.

Additional bearing designs such as the bearing disclosed in U.S. Pat. No. 6,435,050, utilizes a two-piece bearing design with a complex assembly involved to support the rack in the housing. The rack bearing is complex with a multiple piece bearing surface and additional bushings are needed to support the rack in proper meshing engagement with the pinion.

The rack and the pinion each include teeth in meshing engagement with each other. The teeth on the rack, the teeth on the pinion, the housing and the bearing wear as a result of continued repetitive use. As these various components wear, the meshing engagement between the rack and the pinion loosens, thereby causing undesirable noise and vibration in the vehicle. Therefore, some rack and pinion steering systems incorporate an adjustment mechanism to continuously adjust the position of the bearing relative to the housing, thereby re-positioning the rack relative to the pinion to compensate for wear on the rack, the pinion, the adjustment mechanism, the housing and the bearing, and provide for a tight meshing engagement between the rack and the pinion. However, the adjustment mechanism may over-tighten the meshing engagement between the rack and the pinion in response to rebound from a severe vibration, impact, load deflection, or when load reversal occurs.

SUMMARY OF THE INVENTION AND ADVANTAGES

The subject invention provides a steering apparatus for a vehicle. The steering apparatus comprises a housing. The housing defines a chamber having an inner surface. A gear system is supported by the housing. The gear system includes at least a first gear and a second gear in meshing engagement. A bearing is disposed within the chamber. The bearing supports at least one of the first gear and the second gear relative to the housing. The bearing is moveable relative to the housing for adjusting a position of one of the first gear and the second gear relative to another of the first gear and the second gear. An adjustment mechanism is coupled between the bearing and the housing. The adjustment mechanism continuously biases the bearing relative to the housing from an initial position to a second position in response to loosening of the meshing engagement between the first gear and the second gear. The adjustment mechanism repositions one of the first gear and the second gear relative to the other of the first gear and the second gear. A dampener is coupled to one of the bearing and the adjustment mechanism. The dampener resists the relative movement between the bearing and the adjustment mechanism to slow the re-positioning of one of the first gear and the second gear relative to the other of the first gear and the second gear.

Accordingly, the subject invention provides a rack and pinion steering apparatus having an adjustment mechanism to adjust the position of the rack relative to the pinion, thereby compensating for wear between the rack and the pinion. The dampener of the subject invention slows the reaction of the adjustment mechanism to transient conditions, to prevent over-tightening in response to rebound caused by a severe vibration, impact or load deflection event.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Referring to FIGS. 1 through 4, wherein like numerals indicate corresponding parts throughout the several views, a first embodiment of a power steering apparatus is generally shown at 20.

Figure 1:
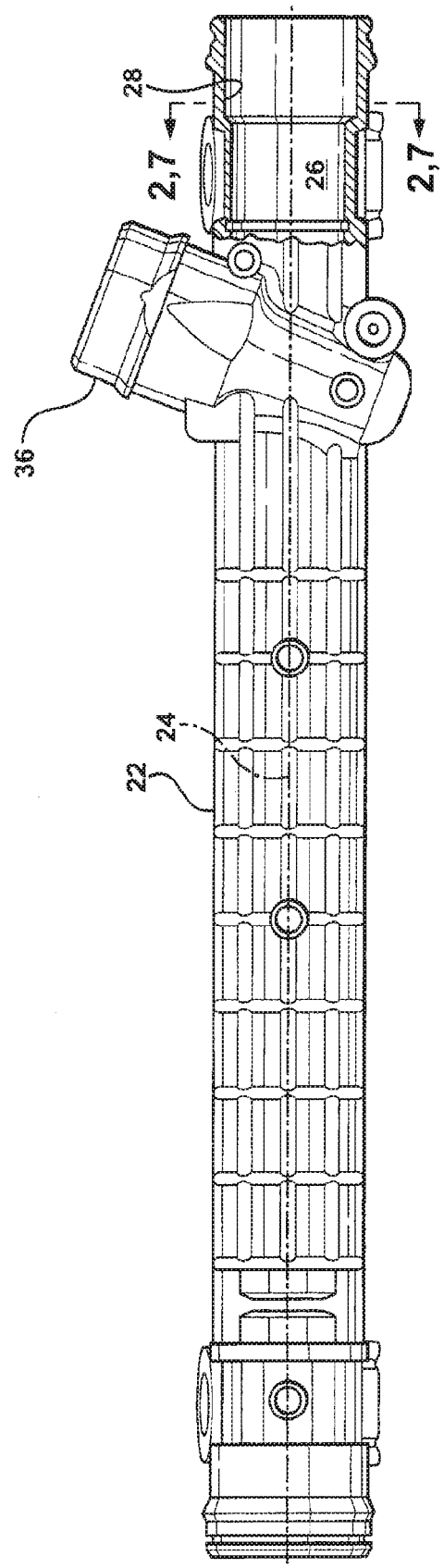
FIG. 1 is a plan view of a housing for a first embodiment of a power steering apparatus and shows the plane 2, 7, upon which the sectional views of FIG. 2 and FIG. 7 are taken.
Figure 2:
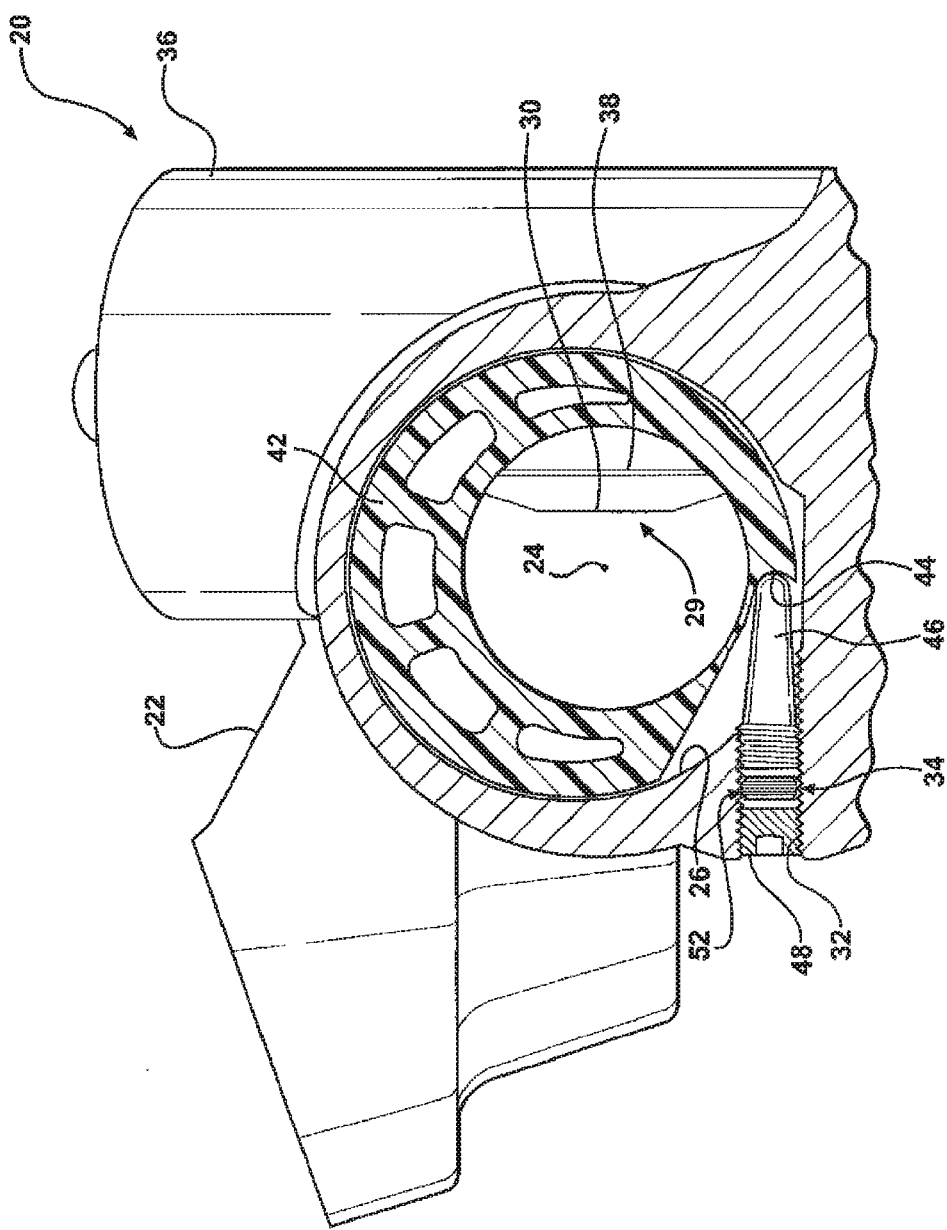
FIG. 2 is a cross sectional view of the first embodiment of the steering apparatus showing an eccentric rack bearing and an adjustment mechanism as taken from the plane 2, 7 shown in FIG. 1.

Referring to FIGS. 1 and 2, the first embodiment of the power steering apparatus includes a housing 22, with the housing 22 defining a chamber 26. The chamber 26 includes an inner surface 28. A gear system 29 is supported by the housing 22. The gear system 29 includes a first gear 30 and a second gear 38. The first gear 30 and the second gear 38 are in meshing engagement with each other.

As described and shown herein, the gear system 29 is a rack and pinion gear system 29. However, it should be appreciated that the gear system 29 may include other types and configurations of gear systems 29, with the housing being configured to support and accommodate the specific type of gear system 29 utilized. As shown and described herein, the first gear 30 includes a rack 30. Accordingly, the housing and the chamber extends along a longitudinal axis 24. The rack 30 is disposed within the chamber 26 and is moveable along the longitudinal axis 24.

As described and shown herein, the second gear 38 of the gear system 29 includes a pinion 38. The housing 22 supports the pinion 38 as is well known in a rack and pinion gear system 29. The pinion extends into the chamber 26 for meshing engagement with the rack 30.

The housing 22 defines an aperture 32 having threads. The aperture 32 extends into the chamber 26 for receiving an adjustment mechanism 34 (discussed in greater detail below). The housing 22 further includes an adjoining extension 36 that is connected to the chamber 26 and extends to rotatably support the pinion 38. The adjoining extension 36, and the pinion 38, are disposed generally transverse to the longitudinal axis 24 and the chamber 26.

The inner surface 28 defines two diameters, a first diameter having a center on the longitudinal axis 24 and a second diameter having a center on a second axis. The first diameter can be offset an amount which will vary depending on the design of the inner surface 28 and the bearing 42 to be supported within the inner surface 28. However, as is known in the art the inner surface 28 of the housing 22 can have different diameters and configurations with varying offset distances between the longitudinal axis 24 and the second axis. It is also appreciated that there can be no offset, which will depend on the bearing 42 design, the rack 30 configuration, and the space and size constraints on the power steering apparatus within the given application. It is also appreciated by one skilled in the art that the inner surface 28 of the housing 22 can be configured to various geometries for supporting and locating the bearing 42, and the rack 30 within the housing 22, as will be further discussed below.

As described above, the rack 30 is disposed within the chamber 26 of the housing 22 and moves linearly along the longitudinal axis 24. The rack 30 moves in response to rotational movement of the pinion 38 as is known in the art. The pinion 38 is rotatably supported in the adjoining extension 36 of the housing 22. The rack 30 defines a plurality of teeth for meshing with the pinion 38 as is well known in the art. The rack 30 translates the rotational movement of the pinion 38 to a linear movement. In a typical application, such as a passenger vehicle, the pinion 38 is connected to the steering wheel (not shown) and rotates in relationship to a movement of the steering wheel by a driver. The rack 30 translates the rotational movement of the pinion 38 into the linear movement which is connected to and moves the steerable wheels of a vehicle, typically through a tie rod engaging each of the steerable wheels. As known in the art, the power steering apparatus typically includes an assisting force (not shown) to move the rack 30 within the housing 22. The assisting force is commonly created by a mechanical system such as a hydraulic, an electric or various other assisting technologies as are known in the art.

At least one of the first gear 30 and the second gear 38 are supported by a bearing 42. As described above, the first gear 30 includes the rack 30, with the rack 30 being supported in the housing 22 by the bearing 42. The bearing 42 is disposed within and engages the inner surface 28 of the chamber 26, and is disposed about the rack 30. The bearing 42 supports one of the first gear 30 and the second gear 38 relative to the housing 22. The bearing 42 is moveable relative to the housing 22 to adjust a position of one of the first gear 30 and the second gear 38 relative to the other of the first gear 30 and the second gear 38. As shown and described herein, the bearing 42 supports the rack 30 relative to the housing 22, and is moveable relative to the housing 22 for adjusting a position of the rack 30 relative to the pinion 38. The bearing 42 in the first embodiment of the power steering apparatus is an eccentric rack bearing 42, and inclues a wall having a continuous varying radial thickness circumferentially surrounding the rack 30 in the housing 22. The wall of the bearing 42 has an outer face and an inner face.

As described above, the wall of the eccentric rack bearing 42 includes the outer face and inner face. The outer face is defined by an outer radius. The outer face is generally circular and defines an external circumference having a first center point. The wall is further defined by the inner face having an inner radius. The inner face is generally circular and defines an internal circumference having a second center point. The second center point is spaced a distance from the first center point to define an amount of eccentricity between the outer circumference and the inner circumference which thereby defines the varying radial thickness of the wall. The varying radial thickness is gradual allowing for a gradual and smooth adjustment of the eccentric rack bearing 42 by the adjustment mechanism 34, as discussed below.

The adjustment mechanism 34 is supported by the housing 22, and is coupled between the eccentric rack bearing 42 and the housing 22. The adjustment mechanism 34 continuously biases the eccentric rack bearing 42 relative to the housing 22 from an initial position to a second position in response to loosening of the meshing engagement between the first gear 30 and the second gear 38, i.e., between the rack 30 and the pinion 38, to re-position one of the first gear 30 and the second gear 38 relative to the other of the first gear 30 and the second gear 38, i.e., to re-position the rack 30 relative to the pinion 38. The adjustment mechanism 34 rotatably adjusts the eccentric rack bearing 42 relative to the longitudinal axis 24 to ensure tight meshing engagement between the pinion 38 and the rack 30. It should be appreciated that as the various components wear down, the meshing engagement between the teeth on the pinion 38 and the teeth on the rack 30 loosens, thereby causing undesirable vibration and noise. Accordingly, the adjustment mechanism 34 rotates the eccentric rack bearing 42 about the longitudinal axis 24, and by way of the eccentric wall thickness of the eccentric rack bearing 42, re-positions the rack 30 relative to the pinion 38 to maintain the proper tight meshing engagement between the teeth on the rack 30 and the teeth on the pinion 38.

The wall of the eccentric rack bearing 42 defines a seat 44. The seat 44 is disposed near the outer face of the wall. The adjustment mechanism 34 engages the seat 44. More specifically, the adjustment mechanism 34 of the first embodiment of the power steering apparatus includes a shaft 46, with the shaft 46 including a first end abutting the seat 44. The first end of the shaft 46 abuts the seat 44 in a generally tangential relationship relative to the eccentric rack bearing 42, near an outer circumference of the eccentric rack bearing 42. Accordingly, linear movement of the shaft 46 creates a torque in the eccentric rack bearing 42 about the longitudinal axis 24. The torque in the eccentric rack bearing 42 rotates the eccentric rack bearing 42 about the longitudinal axis 24.

As described above, the aperture 32 includes threads. The shaft 46 includes a second end having threads. The second end of the shaft 46 is in threaded engagement with the threads on the aperture 32. The threaded engagement between the shaft 46 and the aperture 32 provides for rotational movement of the shaft 46 relative to the housing 22, which translates into linear movement of the shaft 46 along an axis of the aperture 32 relative to the housing 22.

A plug 48 is disposed within the aperture 32 and fixedly attached to the housing 22. Preferably, the plug 48 is in threaded engagement with the aperture 32, and includes a setscrew. However, it should be appreciated that the plug 48 may include some other device affixed to the housing 22 within the aperture 32 to seal the aperture 32. Preferably, a locking mechanism fixedly secures the plug 48 within the aperture 32 to prevent rotation of the plug 48 relative to the housing 22. The locking mechanism may include a staking device, a jam nut, a thread adhesive, or some other suitable device. During assembly of the power steering apparatus, the plug 48 is threaded into the aperture 32 to a desired position, which corresponds to a desired initial position of the rack 30 and the bearing 42. After the plug 48 is properly positioned within the aperture 32, the locking device is positioned, applied or attached to securely fix the position of the plug 48 relative to the housing 22.

A dampener 52 is coupled to one of the eccentric rack bearing 42 and the adjustment mechanism 34. The dampener 52 resists the relative movement between the eccentric rack bearing 42 and the adjustment mechanism 34, thereby slowing the re-positioning of one of the first gear 30 and the second gear 38 relative to the other of the first gear 30 and the second gear 38, i.e., to slow the re-positioning of the rack 30 relative to the pinion 38. Accordingly, the dampener 52 prevents the adjustment mechanism 34 from moving the eccentric rack bearing 42 too quickly in response to rebound from a severe vibration, an impact, a load deflection or when a load reversal occurs. As such, the dampener 52 limits the re-positioning of the eccentric rack bearing 42 to a very slow rate. This permits the adjustment mechanism 34 to compensate for the wear between the various components, while preventing over-tightening of the rack 30 and the pinion 38.

Preferably, the dampener 52 includes a plastic fluid 88. A plastic fluid 88 is a fluid in which the viscosity of the fluid is reduced under shear stress. Preferably, the plastic fluid 88 includes a thixotropic fluid. A thixotropic fluid is a fluid in which, after a sufficient force to shear the fluid is applied, the viscosity of the fluid drops and approaches that of the base lubricant, however, prior to the sufficient shear force being applied, the fluid maintains its high viscosity and is highly resistant to movement or a change in form. Preferably, the thixotropic fluid includes a grease having a high apparent viscosity. However, it should be appreciated that the plastic fluid 88 may include some other suitable fluid. It should also be appreciated that the dampener 52 may include a mechanical device capable of resisting the relative movement of the eccentric rack bearing 42, and is not required to include the plastic fluid 88 as described herein.

Preferably, the plastic fluid 88 includes a worked penetration of less than 175 mm. More preferably, the plastic fluid 88 includes a worked penetration of less than 115 mm. The worked penetration of the plastic fluid 88 is measured using a cone penetration test. The cone penetration test is described in ASTM D217, and is hereby incorporated by reference.

Figure 3:
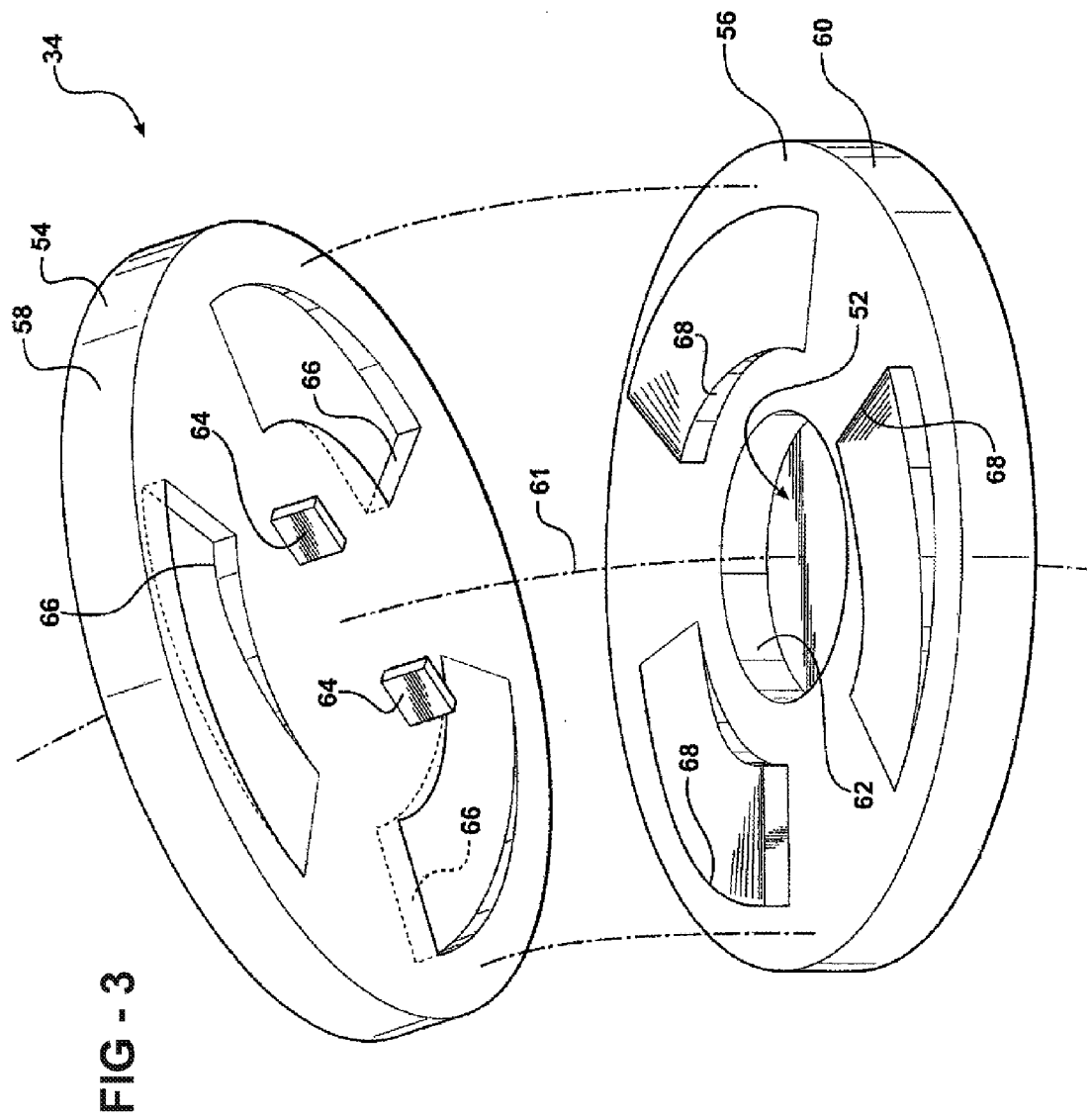
FIG. 3 is an exploded perspective view of a first embodiment of a dampener for the first embodiment of the steering apparatus.
Figure 4:
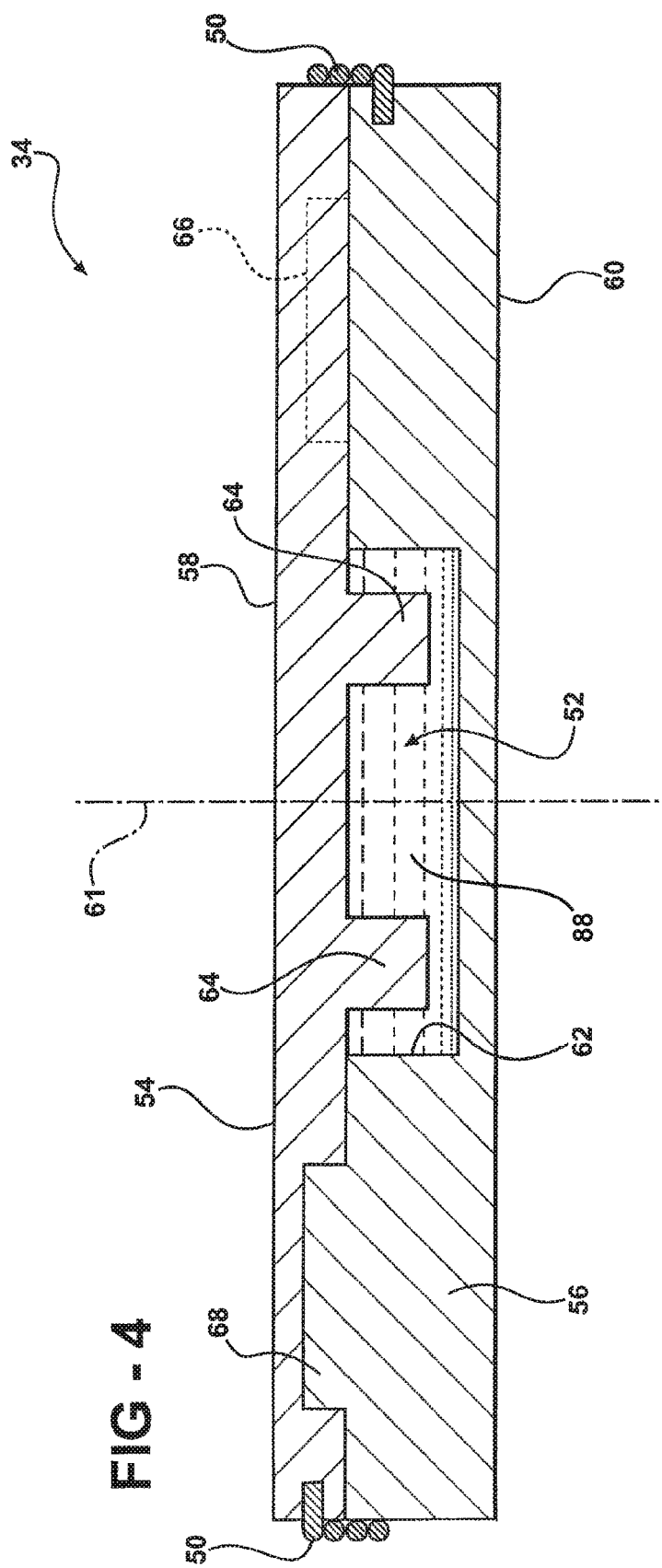
FIG. 4 is a side plan view of the dampener for the first embodiment of the steering apparatus.

Referring to FIGS. 3 and 4, the dampener 52 includes a first member 54 and a second member 56 moveable relative to the first member 54 with the plastic fluid 88 disposed between the first member 54 and the second member 56. As shown in the first embodiment of the power steering apparatus, the dampener 52 is disposed within the aperture 32. The dampener 52 includes a first plate 58 engaging the shaft 46 and a second plate 60 coupled to the housing 22. Accordingly, in the first embodiment of the power steering apparatus 20, the first member 54 includes the first plate 58 and the second member 56 includes the second plate 60. The first plate 58 is rotatable about a central axis 61 relative to the second plate 60, and is axially moveable along the central 61 axis relative to the second plate 60 in response to rotation about the central axis 61.

The second plate 60 defines a cavity 62 with the plastic fluid 88 disposed within the cavity 62. The first plate 58 includes at least one paddle 64 extending into the cavity 62 along the central axis 61. Preferably and as shown, the at least one paddle 64 includes a pair of paddles 64. The paddles 64 engage the plastic fluid 88 within the cavity 62, with the plastic fluid 88 resisting movement of the at least one paddle 64. Accordingly, the interaction between the plastic fluid 88 and the paddles 64 prevents the first plate 58 from moving to quickly relative to the second plate 60, thereby slowing adjustment or damping of the eccentric rack bearing 42.

In the first embodiment of the power steering apparatus, one of the first plate 58 and the second plate 60 includes a first ramp 66 extending along the central axis 61 in a first direction. Another of the first plate 58 and the second plate 60 includes a second ramp 68 opposing the first ramp 66 and extending along the central axis 61 in a second direction opposite the first direction. The second ramp 68 opposes the first ramp 66 for sliding engagement with the first ramp 66. The sliding engagement between the first ramp 66 and the second ramp 68 spreads the first plate 58 and the second plate 60 relative to each other to move the first plate 58 axially along the central axis 61 relative to the second plate 60 as the first plate 58 rotates relative to the second plate 60.

The dampener 52 includes a spring 50 interconnecting the first plate 58 and the second plate 60 for rotating the first plate 58 relative to the second plate 60. Preferably, the spring 50 includes a torsion spring 50. However, it should be appreciated that the spring 50 may include some other type of spring 50 capable of causing rotation of the first plate 58 relative to the second plate 60. As described above, it should be appreciated that the adjustment mechanism 34 and the dampener 52 are integrated into a single device. However, it should be appreciated that the adjustment mechanism 34 and the dampener 52 may include independent and separate devices.

Figure 7:
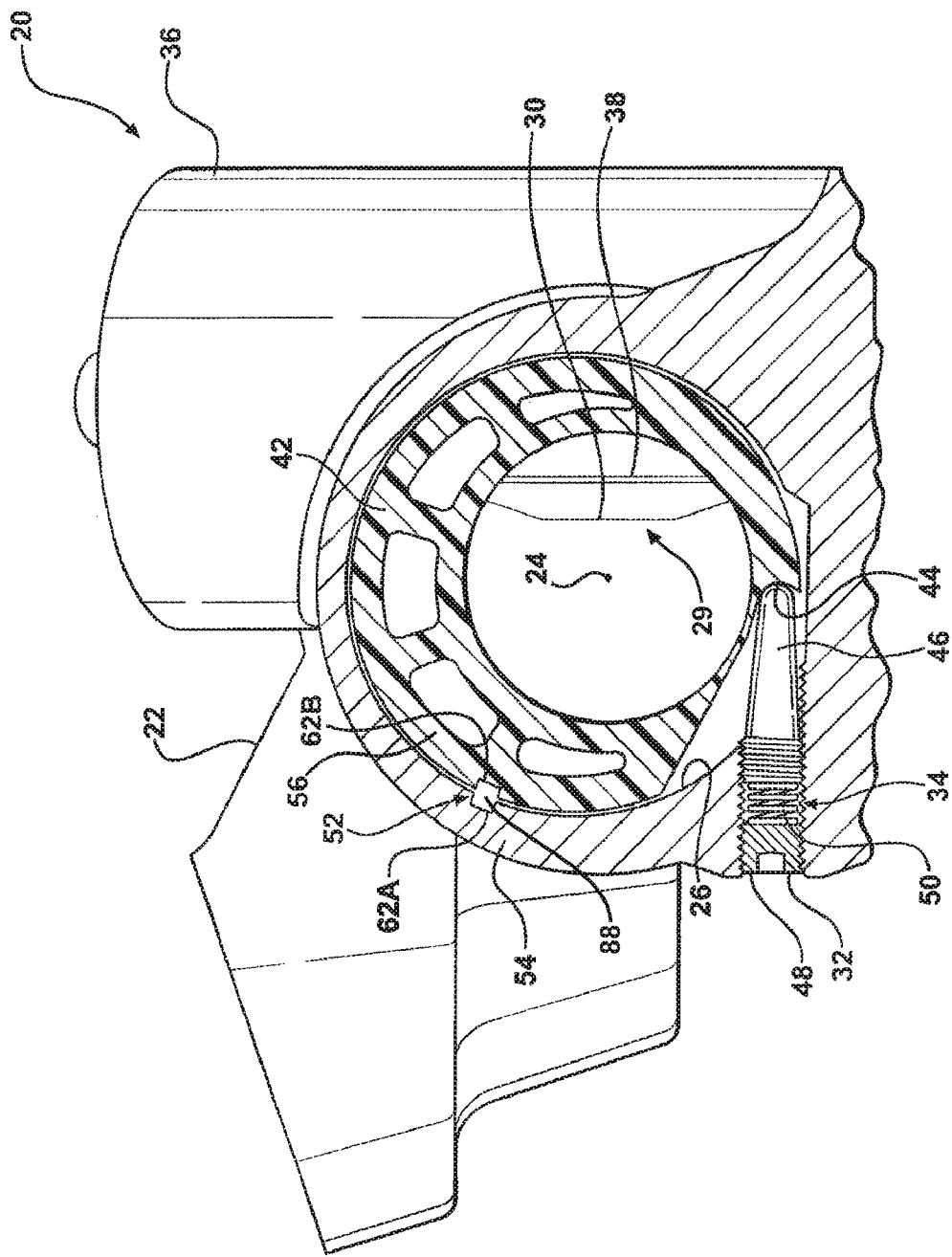
FIG. 7 is a cross sectional view of an alternative first embodiment of the steering apparatus as taken from the plane 2, 7 shown in FIG. 1.

Alternatively, referring to FIG. 7, it should be appreciated that the plastic fluid 88 may be disposed between the eccentric rack bearing 42 and the housing 22 to resist movement of the eccentric rack bearing 42 relative to the housing 22. In which case, the housing 22 may include the first member 54 and the eccentric rack bearing 42 may include the second member 56. The first member 54 may include a first cavity 62A and the second member 56 may include a second cavity 62B opposing the first cavity 62A. The second cavity 62B is moveable relative to the first cavity 62A. The plastic fluid 88 is disposed within the first cavity 62A and the second cavity 62B. Accordingly, the plastic fluid 88 within the first cavity 62A must move relative to the plastic fluid 88 within the second cavity 62B. However, the high viscosity of the plastic fluid 88 interconnecting the first cavity 62A and the second cavity 62B prevents quick movement therebetween.

Figure 5:
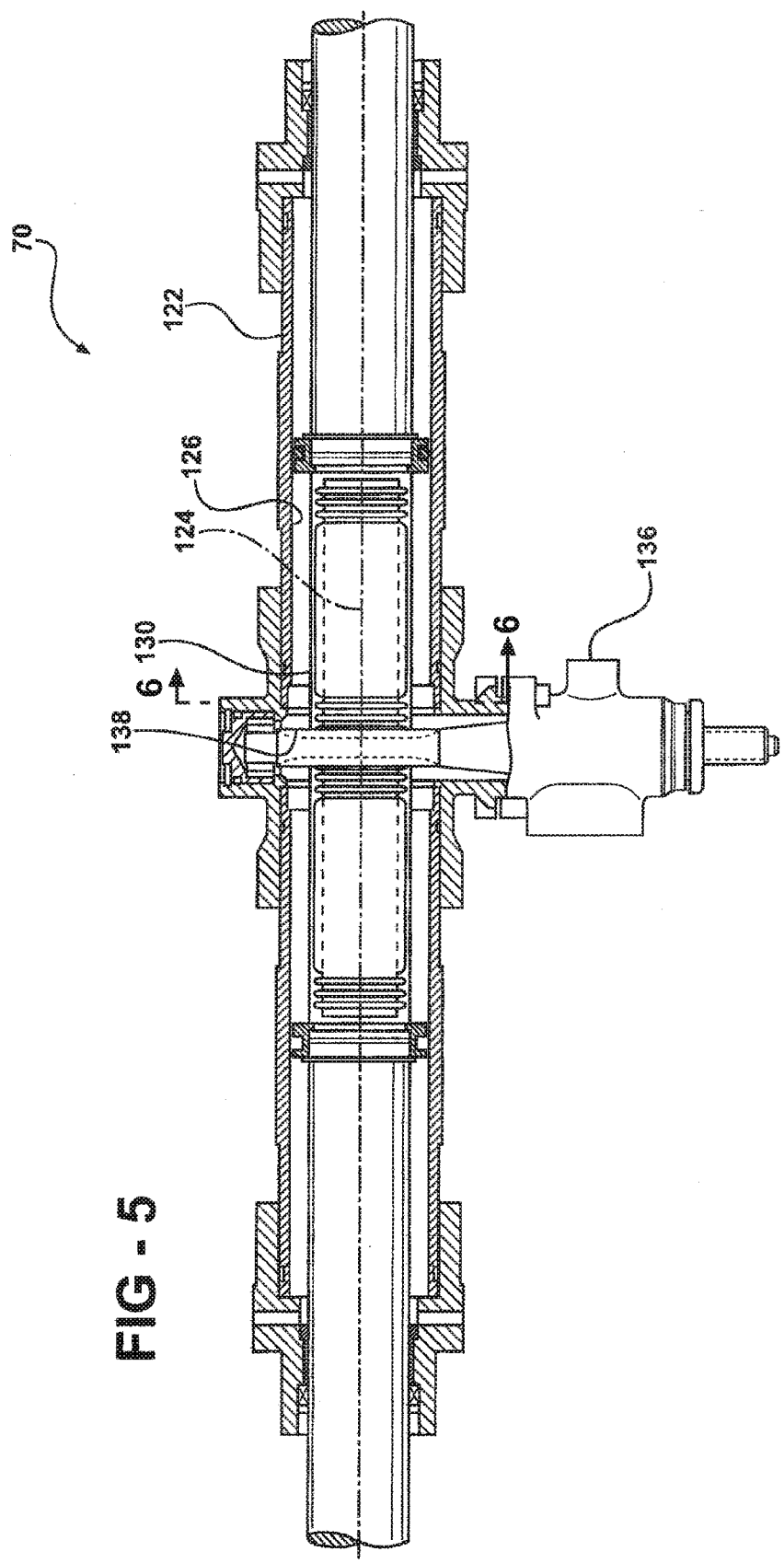
FIG. 5 is a side plan view of a second embodiment of the power steering apparatus and shows the plane 6, upon which the sectional view of FIG. 6 is taken.
Figure 6:
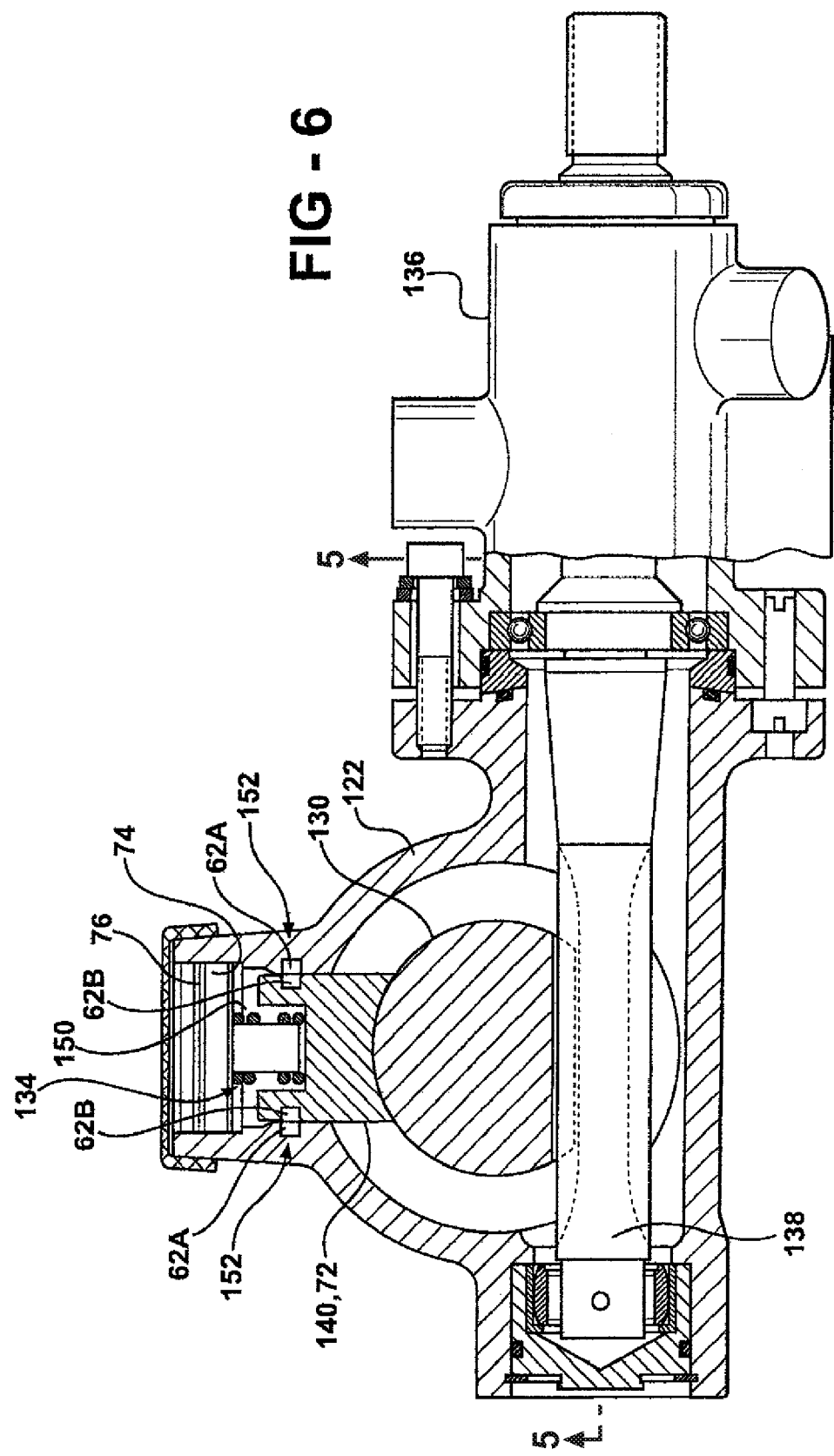
FIG. 6 is a cross sectional view of the second embodiment of the power steering apparatus showing a yoke bearing and an adjustment mechanism and shows the plane 5, upon which the sectional view of FIG. 5 is taken.

Referring to FIGS. 5 and 6, a second embodiment of the power steering apparatus is shown generally at 70. The reference numerals of the second embodiment of the power steering apparatus 70 referring to similar components and/or features previously described for the first embodiment of the power steering apparatus 20 are identified with the same reference numerals utilized for the first embodiment of the power steering apparatus 20 preceded by the numeral 1. For example, the housing 22 of the first embodiment of the power steering apparatus 20 is referenced with the reference numeral 122 in the second embodiment of the power steering apparatus 70. The bearing 140 of the second embodiment of the power steering apparatus 70 includes a yoke bearing 72 as in well known in the art. In the second embodiment of the power steering apparatus 70, the housing 122 defines a bore 74, with the yoke bearing 72 being disposed within the bore 74 for supporting the rack 130.

A cap 76 is fixedly attached to the housing 122. The cap 76 is disposed within the bore 74. The adjustment mechanism 134 includes a spring 150 disposed within the bore 74 between the cap 76 and the yoke bearing 72. Preferably, the spring 150 includes a coil spring 150. The spring 150 biases against the yoke bearing 72 to urge the yoke bearing 72 and thereby the rack 130 into engagement with the pinion 138.

The dampener 152 is disposed between the yoke bearing 72 and the bore 74. The dampener 152 of the second embodiment of the power steering apparatus 70 includes the plastic fluid 88 having the cone penetration of less than 175 mm as measured by ASTM D217 as described above for the first embodiment of the power steering apparatus 20.

The bore 74 defines the first cavity 162A and the yoke bearing 72 defines the second cavity 162B opposing the first cavity 162B. The second cavity 162B being moveable relative to the first cavity 162A. The plastic fluid 88 is disposed within the first cavity 162A and the second cavity 162B to resist movement of the yoke bearing 72 relative to the housing 122. It should therefore be apparent that the dampener 52, 152 of the subject invention may be utilized in several different embodiments of the power steering apparatus.

The invention has been described in an illustrative manner, and it is to be understood that the terminology which has been used is intended to be in the nature of words of description rather than of limitation. As is now apparent to those skilled in the art, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A steering apparatus for a vehicle, said apparatus comprising:
    a housing defining a chamber having an inner surface;
    a gear system supported by said housing and having at least a first gear and a second gear in meshing engagement;
    a bearing disposed within said chamber and supporting at least one of said first gear and said second gear relative to said housing for movement relative to said housing for adjusting a position of one of said first gear and said second gear relative to another of said first gear and said second gear;
    a spring disposed between said bearing and said housing for continuously biasing said bearing relative to said housing so as to rotate the eccentric rack bearing about the longitudinal axis in response to loosening of said meshing engagement between said first gear and said second gear to reposition one of said first gear and said second gear relative to the other of said first gear and said second gear; and
    a dampener coupled to one of said bearing and said adjustment mechanism for resisting said relative movement between said bearing and said adjustment mechanism to slow said re-positioning of one of said first gear and said second gear relative to the other of said first gear and said second gear;
    wherein said dampener includes a plastic fluid;
    wherein said dampener is disposed within said aperture and includes a first plate engaging said shaft and a second plate coupled to said housing with said first plate rotatable about a central axis relative to said second plate and axially moveable along said central axis relative to said second plate in response to rotation about said central axis; and
    wherein said second plate defines a first cavity with said plastic fluid disposed within said cavity and said first plate includes at least one paddle extending into said cavity along said central axis for engaging said plastic fluid with said plastic fluid resisting movement of said at least one paddle.

2. An apparatus as set forth in claim 1 wherein said plastic fluid includes a thixotropic fluid.

3. An apparatus as set forth in claim 2 wherein said thixotropic fluid includes a grease.

4. An apparatus as set forth in claim 1 wherein said plastic fluid includes a worked penetration of less than 175 mm.

5. An apparatus as set forth in claim 4 wherein said housing and said chamber extend along a longitudinal axis and wherein said first gear includes a rack disposed within said chamber for movement along said longitudinal axis and said second gear includes a pinion supported by said housing and extending into said chamber for meshing engagement with said rack.

6. An apparatus as set forth in claim 5 wherein said bearing includes an eccentric rack bearing and wherein said housing defines an aperture and said adjustment mechanism includes a shaft in threaded engagement with said aperture and abutting said eccentric rack bearing.

7. An apparatus as set forth in claim 1 wherein said plastic fluid includes a worked penetration of less than 115 mm.

8. An apparatus as set forth in claim 1 wherein said dampener includes a first member and a second member moveable relative to said first member with said plastic fluid disposed between said first member and said second member.

9. An apparatus as set forth in claim 8 wherein said second member includes a second cavity opposing said first cavity and moveable relative to said first cavity with said plastic fluid disposed within said first cavity and said second cavity.

10. An apparatus as set forth in claim 9 wherein said housing includes said first member and said bearing includes said second member.

11. An apparatus as set forth in claim 1 wherein one of said first plate and said second plate includes a first ramp extending along said central axis in a first direction and another of said first plate and said second plate includes a second ramp opposing said first ramp and extending along said central axis in a second direction opposite said first direction for sliding engagement with said first ramp to move said first plate axially along said central axis relative to said second plate as said first plate rotates relative to said second plate.

12. An apparatus as set forth in claim 11 wherein said a spring is disposed between said first plate and said second plate for biasing said first plate for rotation relative to said second plate.

13. An apparatus as set forth in claim 12 wherein said spring includes a torsion spring.

14. An apparatus as set forth in claim 1 wherein said housing and said chamber extend along a longitudinal axis and wherein said first gear includes a rack disposed within said chamber for movement along said longitudinal axis and said second gear included a pinion supported by said housing and extending into said chamber for meshing engagement with said rack.

15. An apparatus as set forth in claim 14 wherein said housing defines a bore and said bearing includes a yoke bearing disposed within said bore for supporting said rack.

16. An apparatus as set forth in claim 15 further comprising a cap fixedly attached to said housing and disposed within said bore and wherein said adjustment mechanism includes a spring disposed within said bore between said cap and said yoke bearing for biasing against said yoke bearing.

17. An apparatus as set forth in claim 14 wherein said dampener is disposed between said yoke bearing said bore.

18. An apparatus as set forth in claim 17 wherein said bore defines a first cavity and said yoke bearing defines a second cavity opposing said first cavity and moveable relative to said first cavity with said plastic fluid disposed within said first cavity and said second cavity.

* * * * *